United States Patent [19]

Tezuka

[11] 4,395,103

[45] Jul. 26, 1983

[54] FILM WINDING DEVICE FOR CAMERA

[75] Inventor: Nobuo Tezuka, Tokyo, Japan

[73] Assignee: Canon Kabushiki Kaisha, Tokyo, Japan

[21] Appl. No.: 283,883

[22] Filed: Jul. 16, 1981

[30] Foreign Application Priority Data

Jul. 22, 1980 [JP] Japan .................................. 55-100080

[51] Int. Cl.³ .............................................. G03B 1/04
[52] U.S. Cl. .................................... 354/212; 354/288; 242/71.4
[58] Field of Search ....................... 354/275, 212, 288; 242/71.1, 71.4, 71.5

[56] References Cited

U.S. PATENT DOCUMENTS 2,662,696  12/1953  Nerwin ............................. 242/71.1
3,377,935   4/1968  Furusawa ............................. 354/212
3,567,147   3/1971  Engelsmann et al. .......... 354/275 X Primary Examiner—John Gonzales
Attorney, Agent, or Firm—Toren, McGeady and Stanger

[57] ABSTRACT

A film winding device for a camera wherein an engagement member is engaged into the perforation of the film so as to wind the film on the spool while the engagement member is moved into the inside of the circumference of the spool along with the film winding operation so as to carry out the film winding on the spool smoothly. A film guide member is provided in order to guide the end of the film to be wound on the spool along a direction toward the spool in such a manner that it can be avoided that the end of the film should be pressed against a perforation of the film during the winding process thereby to avoid misalignment of the film.

6 Claims, 8 Drawing Figures

FILM WINDING DEVICE FOR CAMERA

BACKGROUND OF THE INVENTION

1. Field of the Invention

The present invention relates to a film winding device for a camera.

2. Description of the Prior Art

In order to load film in a conventional camera, the film end is inserted into a slit provided on a spool and a claw is engaged into the perforation of the film so as to fix the film on the spool. However, in such a case, the operator must insert the film end into a narrow slit requiring a manipulation which detracts from ease of operability of the camera.

In order to overcome these shortcomings, there has been proposed a device so designed that a friction member of rubber or the like is provided on the circumference of the spool, whereby the film is pressed against the spool by means of the guide roller or the like in such a manner that the film can be loaded with relative ease by means of the friction occurring between the friction member and the film. Although ease of operability is improved considerably by means of this device, there still remains the problem that the operation becomes unstable due to changes in factors such as humidity, temperature or the like which might affect the frictional characteristics of the rubber material. Further, because a number of guide rollers must be used, assembly and adjustment become complicated, thereby causing inconvenience. In order to eliminate the unstable friction member, there has been proposed provision of fixing claws to be engaged into the film perforation around the circumference of the spool, whereby it is also necessary to provide many guide rollers in the same way as in the above-mentioned case.

Although in another method a movable claw having a rotation center is provided on the circumference of the spool, in such a method the diameter of the wound film is not stabilized, because the claw member is on the circumference of the spool, and the film surface is damaged due to the contact of the film with the wall of the spool chamber and the film cannot be wound to the end thereof.

Further, due to another problem concerning film winding, the end of the film strikes against the film surface so that the film cannot be wound smoothly, which is inconvenient.

SUMMARY OF THE INVENTION

Taking the above-mentioned circumstances into consideration, it is a purpose of the present invention to provide a film winding device of simple construction wherein film can be loaded in an easy and a sure way.

With the invention, the claw to be engaged into the perforation of the film to be wound on the spool is constructed movable in such a manner that the claw excepting the end is inside of the circumference of the spool, while a film guide member for guiding the end of the film engaged with the claw toward the side of the spool is provided in order to eliminate the shortcomings of the conventional device.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE PREFERRED EMBODIMENTS

Figure 1:
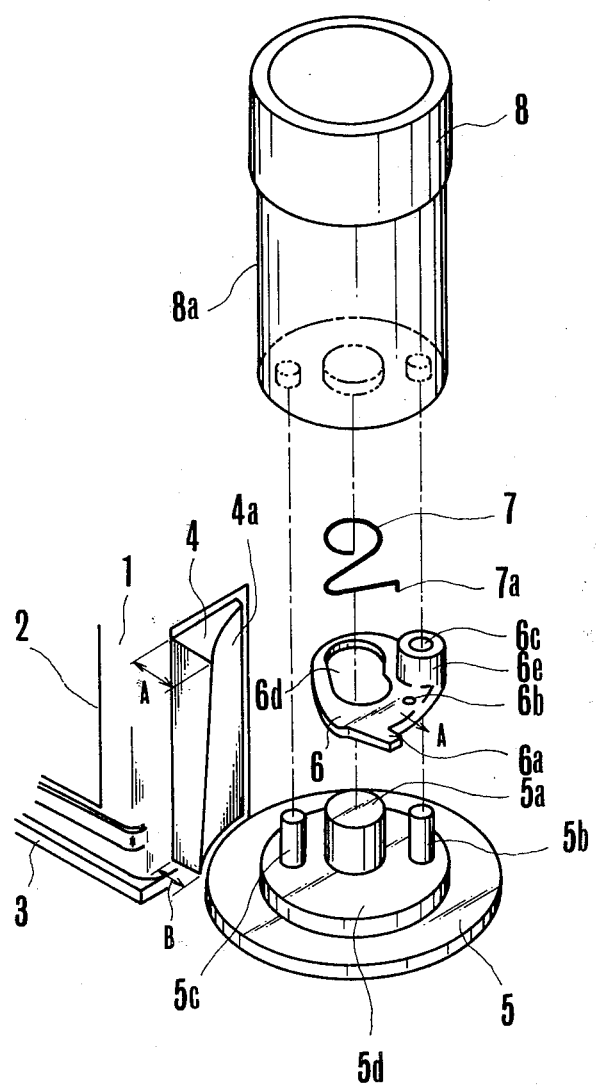
FIG. 1 shows an embodiment of the film winding device of the present invention in an exploded perspective view.

Referring now to the accompanying drawings and particularly to FIG. 1, the present invention is shown as comprising a camera body 1 having picture openings 2 formed therein. Below the picture opening 2 in the camera body 1, a film guide rail 3 is formed so as to lead the film into the spool chamber. A film guide 4 is provided on the spool chamber wall in the neighborhood of the picture opening 2 in the camera body 1, as is shown in the drawing. A film guide plane 4a of the film guide 4 forms a curved plane so as to give a "putting aside effect" to the film. A spool rim 5 has formed at its center a disc-shaped projection 5d having thereon a central shaft 5a and shafts 5b, 5c. On the spool rim 5 a spool 8 is secured by means of a claw member 6 to be explained hereinafter. The circumference of the disc-shaped projection 5d is formed almost equal to the circumference 8a of the spool 8.

At a certain determined position along the circumference of the claw member 6, a claw 6a to be engaged in the perforation of the film is formed as is shown in the drawing, while a guide groove 6d is provided at the center with an engagement hole 6c being provided in the neighborhood of the circumference. The claw member 6 is mounted on the projection 5d of the spool rim 5 so as to be rotatable within a certain determined range by engagement of the shaft 5b into the hole 6c and the center shaft 5a into the guide groove 6d. Further, the claw member 6 is urged by means of a spring 7 whose one end is anchored on the center shaft 5a and whose other end 7a is engaged in a hole 6b of the claw member 6 in a direction along which the claw 6a projects along the circumference, namely in the counterclockwise direction (see arrow) in the drawing.

As indicated above, the spool 8 is secured on the claw member 6 by means of the shafts 5a, 5b, 5c so as to be rotated as one body with the spool rim 5 by means of the winding drive (not shown in the drawing) at the time of the film winding. Further, the circumference of the bearing hole 6c of the claw member 6 projects so as to form a cylinder 6e in order to avoid play between the bearing hole 6c and the shaft 5b.

Figure 2:
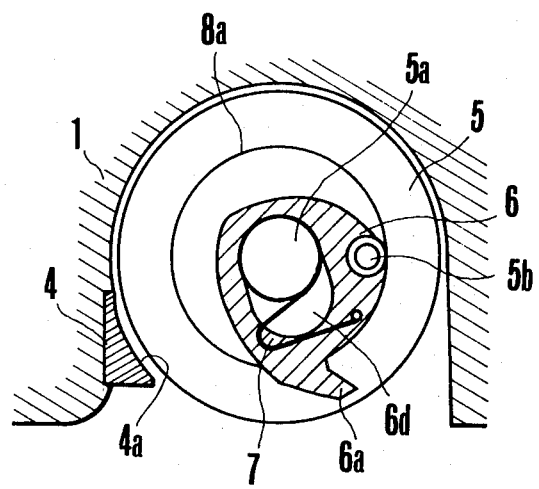
FIG. 2 shows the embodiment in section.

FIG. 2 shows that the claw member 6 is kept by means of the spring 7 in the neighborhood of the circumference of the spool rim whereby the claw 6a projects from the circumference of the spool 8. In case the spool 8 is rotated counterclockwise while the claw 6a is engaged in the perforation of the film, as will be explained later, the claw member 6 is rotated by means of the tension of the film in the clockwise direction against the strength of the spring. Thereby, along with the rotation of the claw member 6, the claw 6a moves so as to enter into the inside of the circumference 8a of the spool 8 and at the final position, restricted by means of the guide groove 6d, the major part of the claw 6a excepting the end is inside of the circumference 8a of the spool 8. In this case, the projection amount δ of the claw 6 from the circumference 8a of the spool 8 at the final position is set a little larger than the thickness of the film base.

Figure 3:
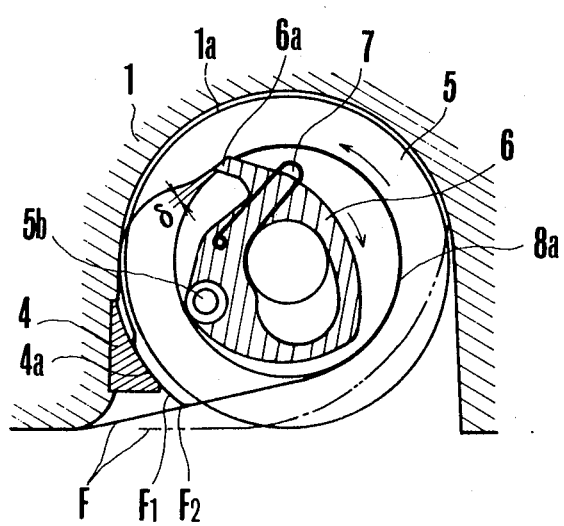
FIGS. 3 to 5 are sectional views showing the film winding processes.
Figure 4:
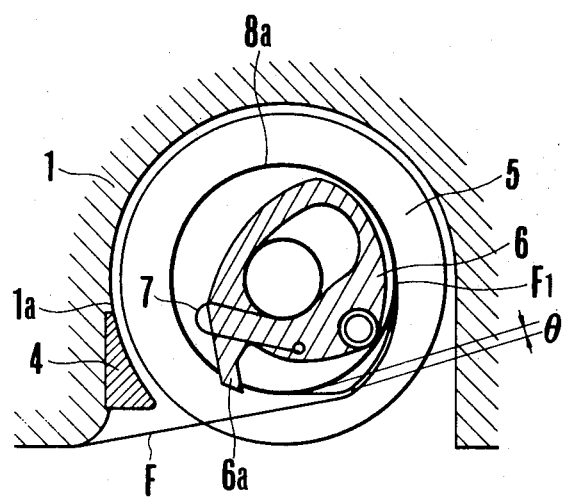
Figure 5:
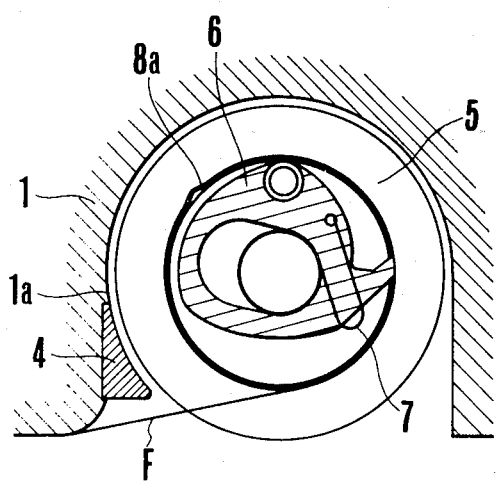

In the case of the film winding device described, the film F is wound upon the spool 8 through the processes shown in FIGS. 3 to 5. Namely, in FIG. 3 when the spool 8 is rotated while the film F is loaded as is shown in two-dot-dash line, the claw 6a is engaged in the perforation of the film F along with the rotation of the spool 8 so as to start to wind the film F. When the spool 8 is rotated while the claw 6a is engaged in the perforation, the claw member 6 is rotated around the shaft 5a along the clockwise direction against the strength of the spring 7 due to the tension of the film F as mentioned above, whereby the claw 6a excepting the end is inside of the circumference 8a of the spool 8 as shown in the drawing. Because at this time, the last projection amount δ of the claw 6a is set a little larger than the thickness of the base of the film F, there is no danger of disengagement of the claw out of the perforation.

Further, when as is shown in FIG. 3, the distance between the position at which the claw 6a is engaged with the film F and the end $F_1$ is large to some extent, as is shown in solid line, the end $F_1$ of the film is in contact with the middle $F_2$ of the film when the spool 8 has been rotated almost halfway. Because in this case, the film guide 4 is provided in the wall 1a of the spool chamber in the camera body 1, the end $F_1$ is pushed toward the spool 8 in such a manner that the film is wound smoothly. If the film guide 4 is not provided, the film end $F_1$ is brought at a right angle to the middle $F_2$, whereby the film cannot be wound smoothly. In case there is a danger that the end $F_1$ is turned toward the picture opening, the film is thereby wound while the end is bent and the diameter of the wound film is larger in such a manner that the film F is brought into contact with the wall 1a of the spool chamber. When the spool 8 is further rotated while the film $F_1$ has been guided by means of the film guide 4 toward the spool 8, the film is tightly wound while the film end $F_1$ slides along the circumference 8a of the spool as is shown in FIG. 4. Namely, the bulging "θ" of the film F due to the looseness becomes gradually smaller until finally, as is shown in FIG. 5, the film F is wound along the circumference 8a of the spool.

In case a claw other than claw 6a is provided, in the film winding processes shown in FIGS. 3 to 5, the film end $F_1$ or the perforation on the way is engaged with the other claw so that the bulging "θ" shown in FIG. 4 remains as it stands, whereby the diameter of the wound film becomes larger, which is inconvenient. Thus, it is desirable that only one claw 6a engaging in the perforation of the film F is provided, while the circumference 8a of the spool is as frictionless as possible.

Figure 6:
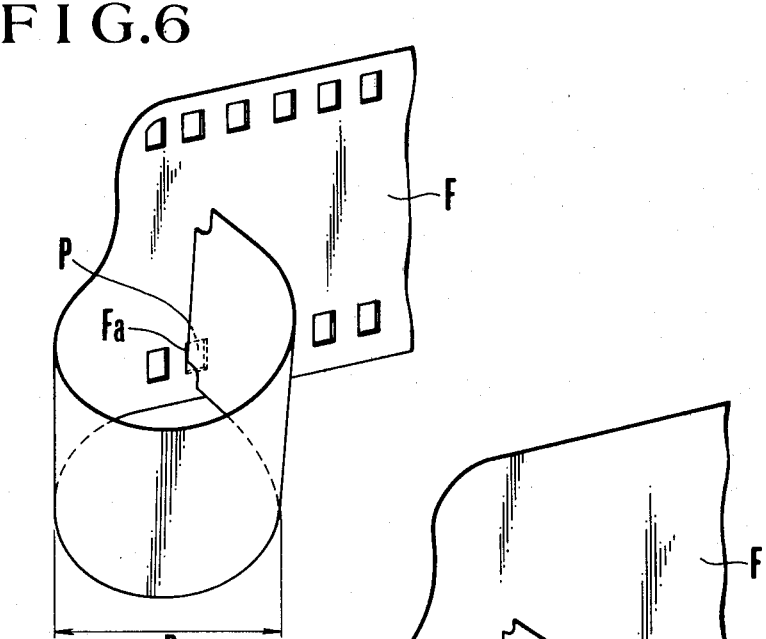
FIGS. 6 and 7 are perspective views showing the state of the film during the winding processes.
Figure 7:
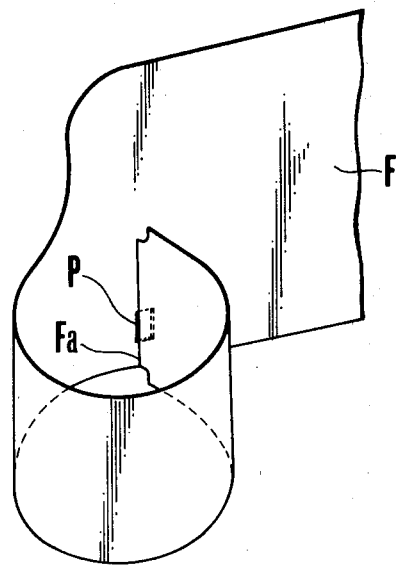

FIGS. 6 and 7 show the condition of the film F corresponding to that shown in FIG. 3. If the lower end Fa of the film is engaged in the perforation P as is shown in FIG. 6 when the film F which has been engaged with the claw 6a is almost once wound, the diameter "D" of the wound film becomes considerably larger than that of the spool 8 during the processes shown in FIGS. 3 to 4, whereby the above-mentioned inconvenience takes place. There is a danger in some cases that the claw 6a is disengaged out of the perforation due to the tightening strength of the film in such a manner that it is impossible to wind the film, which is inconvenient. In order to eliminate such an inconvenience, it is necessary that the lower end Fa of the film does not enter into alignment with the perforation P in case the film F assumes the state shown in FIG. 3. In the present specification, this is called the "putting aside effect" to lead the film into the above-mentioned state. Namely, by forming the film guide plane 4a of the film guide 4 so as to impart the "putting aside effect" to the film as is shown in FIG. 1, for example in such a manner that the upper end A of the one side is made larger than the lower end B while the guide plane 4a is inclined downwards, the film F is wound as is shown in FIG. 7. By means of this composition, the film winding processes shown in FIG. 3 to FIG. 5 are carried out smoothly.

Figure 8:
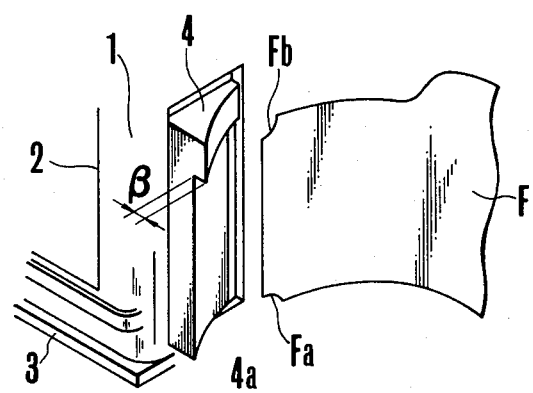
FIG. 8 is a perspective view showing another embodiment of the film guide.

Further, in the case of the above-mentioned embodiment, the lower end Fa of the film is brought under the perforation P. However, the same effect can be obtained when the lower end Fa of the film is brought above the perforation P. In this case, it is sufficient to form the guide plane 4a of the film guide 4 oppositely curved to that of the embodiment shown. Further, as is shown in FIG. 8, the step "B" for restricting the upper end Fb of the film is provided on the film guide 4 so as to feed the end Fb of the film parallel to the film guide rail 3 of the camera body in order to avoid the engagement of the lower end Fa into the perforation.

As explained above, in the film winding device of the present invention, the claw to be engaged in the perforation of the film to be wound on the spool is designed to be movable in such a manner that the claw excepting the end part enters into the inside of the spool due to the tension of the film, thereby to guide the film for leading the end of the film engaged with the claw to the side of the spool. In this way, merely by rotating the spool in the state that the film end is positioned on the circumference of the spool, the film can be wound on the spool smoothly.

Consequently, in accordance with the present invention, the film can be loaded in an easy and sure way by means of a remarkably simple construction. Particularly because a friction member, such as rubber, as is made use of in the conventional device, is not used in the film winding device in accordance with the present invention, the durability of the device is remarkably superior. Further, the claw excepting the end is inside of the spool in the state that the film has been wound, the diameter of the wound film is stabilized so that an accident due to the contact of the film with the wall of the film chamber can be avoided.

While a specific embodiment of the invention has been shown and described in detail to illustrate the application of the inventive principles, it will be understood that the invention may be embodied otherwise without departing from such principles.

I claim:

1. A camera having a film winding mechanism, comprising:
   a spool for winding film thereon;
   an engagement member having a guide groove into which a rotation shaft of the spool is engaged and having an engaging portion at its end, said engagement member being engaged at a predetermined position on a circle coaxial to the rotating shaft within the circumference of the spool, and rotatable around said predetermined position within a range defined by the contact of the guide groove wall against the rotation shaft of the spool; and an elastic member for urging the engagement member outwardly out of the circumferential surface of the spool, whereby when the film is engaged at its perforation with the engaging portion and wound, the engagement member is moved by the tension of the film against the urging force of the spring to a position where it is restricted by the contact of the rotation shaft against the guide groove wall, the shape of the guide groove being designed so as to allow the projection of the engaging portion out of spool circumference to be slightly larger than the base thickness of the film.

2. A camera having a film winding mechanism, comprising:

a spool for winding a film thereon;

a spool rim fixed to the spool, said rim being provided with a central shaft around which the spool rotates and an engaging shaft on a circle coaxial to the central shaft;

an engagement member having a guide groove into which the central shaft is engaged and an engaging claw portion at its end, said engaging claw portion being pivoted by the engaging shaft and movable therearound within a range restricted by the guide groove and the central shaft, said engagement member being held between the spool and the spool rim; and an elastic member for urging the engagement member outwardly out of the spool circumference, whereby when the film is not engaged at its perforation with the claw portion, the engagement member is urged by the elastic member to project from the spool circumference, and when the film is engaged with the claw portion, and is wound, the engagement member is moved inwardly of the spool circumference by the tension of the film against the urging force of the elastic member and is stopped at a position where it is restricted by the guide groove and the central shaft, the shape of the guide groove being designed so as to allow the projection of the engaging claw portion from the spool circumference at the restricted position to be slightly larger than the base thickness of the film.

3. A camera having a film winding mechanism comprising:

spool means having an outer cylindrical circumferential surface for winding film thereon;

an engagement member mounted on said spool means including a claw member for engaging within perforations in said film as said film is wound on said spool means;

means pivotally mounting said engagement member relative to said spool means to enable said claw member to move radially relative to said circumferential surface for engagement with said film perforations;

said mounting means including a pivotal connection connecting said engagement member for pivotal movement relative to said spool means, a rotation shaft on said spool means and a guide groove on said engagement member engaging said rotation shaft, said guide groove and said rotation shaft cooperating to limit the range of pivotal motion of said engagement member about said pivotal connection thereby to determine the range of movement of said claw member relative to said circumferential surface; and spring means engaged between said engagement member and said spool means urging said claw member radially outwardly of said circumferential surface.

4. A camera according to claim 3 wherein said claw member is movable between a radially innermost and a radially outermost point relative to said circumferential surface of said spool means, said guide groove being configured to maintain the location of said radially innermost point such that said claw member protrudes from said circumferential surface a distance greater than the thickness of said film.

5. A camera having a film winding mechanism, comprising:

a spool chamber;

a spool arranged in said spool chamber on which film is wound;

an engagement member engaging into a perforation of said film, the film being wound on the spool during a film winding operation in the engaged state of said member in the perforation of said film; and a guide member having a curved surface slanted with respect to the spool circumference, said guide member being fixed on the inside wall of said spool chamber on the side of a picture opening portion of said camera and having a thickness which increases towards the film winding direction and a guide surface which is slanted with respect to the rotation direction of the spool.

6. A camera having a film winding mechanism, comprising:

a spool chamber;

a spool arranged in the spool chamber on which film is wound;

an engagement member engaging into a perforation of said film, the film being wound on the spool during a film winding operation in the engaged state of said member in the perforation of said film; and a guide member fixed on the inside wall of said spool chamber on the side of a picture opening portion of the camera, and having a thickness which increases toward the film winding direction and a guide surface which comprises a first surface and a second surface forming a step therebetween.

* * * * *